United States Patent

Lansard

[11] 4,258,484
[45] Mar. 31, 1981

[54] IMPLEMENT POSITION INDICATOR

[76] Inventor: Andre L. Lansard, Box 16, Group 10, R.R. #1, Dugald, Manitoba, Canada

[21] Appl. No.: 9,165

[22] Filed: Feb. 5, 1979

[30] Foreign Application Priority Data

Feb. 10, 1978 [CA] Canada .................................. 296948

[51] Int. Cl.³ ........................ E01H 5/00; H01H 35/14
[52] U.S. Cl. ................................ 37/41; 37/DIG. 19; 212/153; 200/61.53; 200/47; 200/275
[58] Field of Search .......... 37/41, 50, 42 R, DIG. 19, 37/DIG. 20; 172/782, 239, 430; 212/39 MS, 39 A, 39 P; 340/686, 687, 691; 200/61.53, 275, 286, 52 R, 47

[56] References Cited

U.S. PATENT DOCUMENTS

| | | | |
|---|---|---|---|
| 2,851,799 | 9/1958 | Meents et al. | 37/DIG. 19 |
| 3,017,046 | 1/1962 | Rund et al. | 37/DIG. 19 |
| 3,039,087 | 6/1962 | Huston | 37/DIG. 19 |
| 3,233,349 | 2/1966 | Becton | 37/DIG. 19 |
| 3,512,589 | 5/1970 | Ulrich | 172/430 X |
| 3,907,136 | 9/1975 | Christides et al. | 37/DIG. 19 X |
| 3,975,723 | 8/1976 | Bowling et al. | 340/686 X |
| 4,044,610 | 8/1977 | Oldaeus et al. | 37/DIG. 19 X |
| 4,107,859 | 8/1978 | Keith | 37/DIG. 19 |
| 4,159,474 | 6/1979 | Wooldridge | 340/686 X |

FOREIGN PATENT DOCUMENTS 692610  8/1964  Canada .................................... 172/782

*Primary Examiner*—E. H. Eickholt
*Attorney, Agent, or Firm*—Stanley G. Ade

[57] ABSTRACT

An adjustable contact portion is detachably secured to the mast of an implement such as a snow plow blade and the other contact is secured to the fluid operator in the mast which raises and lowers the blade. These contacts are operatively connected to the battery of the implement and to an indicator adjacent the operator. The operator sets the adjustable contact portion and when the blade is lowered to the desired degree, the two contacts engage thus completing the circuit and operating the indicator so that the operator is informed that the blade is at the lowermost position desired. The device may also be used on agricultural implements such as discers or the like in order to indicate when a preset depth is reached or digressed from.

6 Claims, 7 Drawing Figures

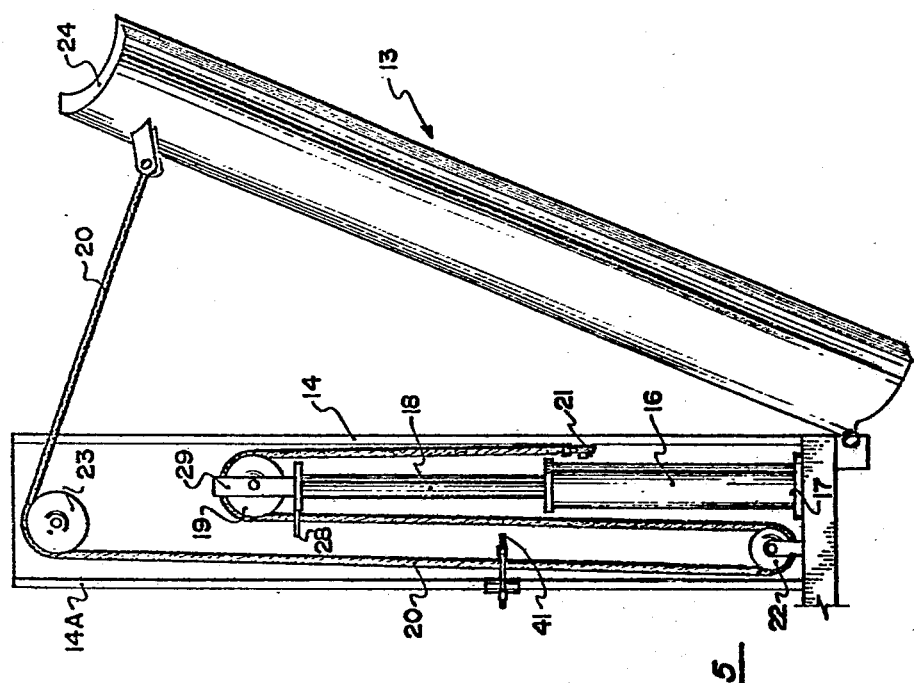
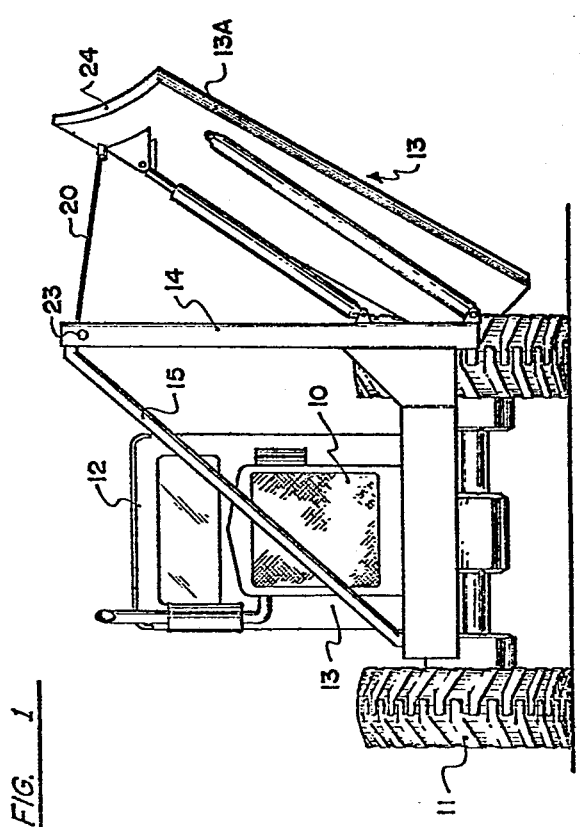
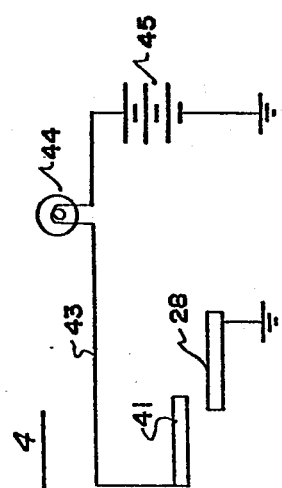

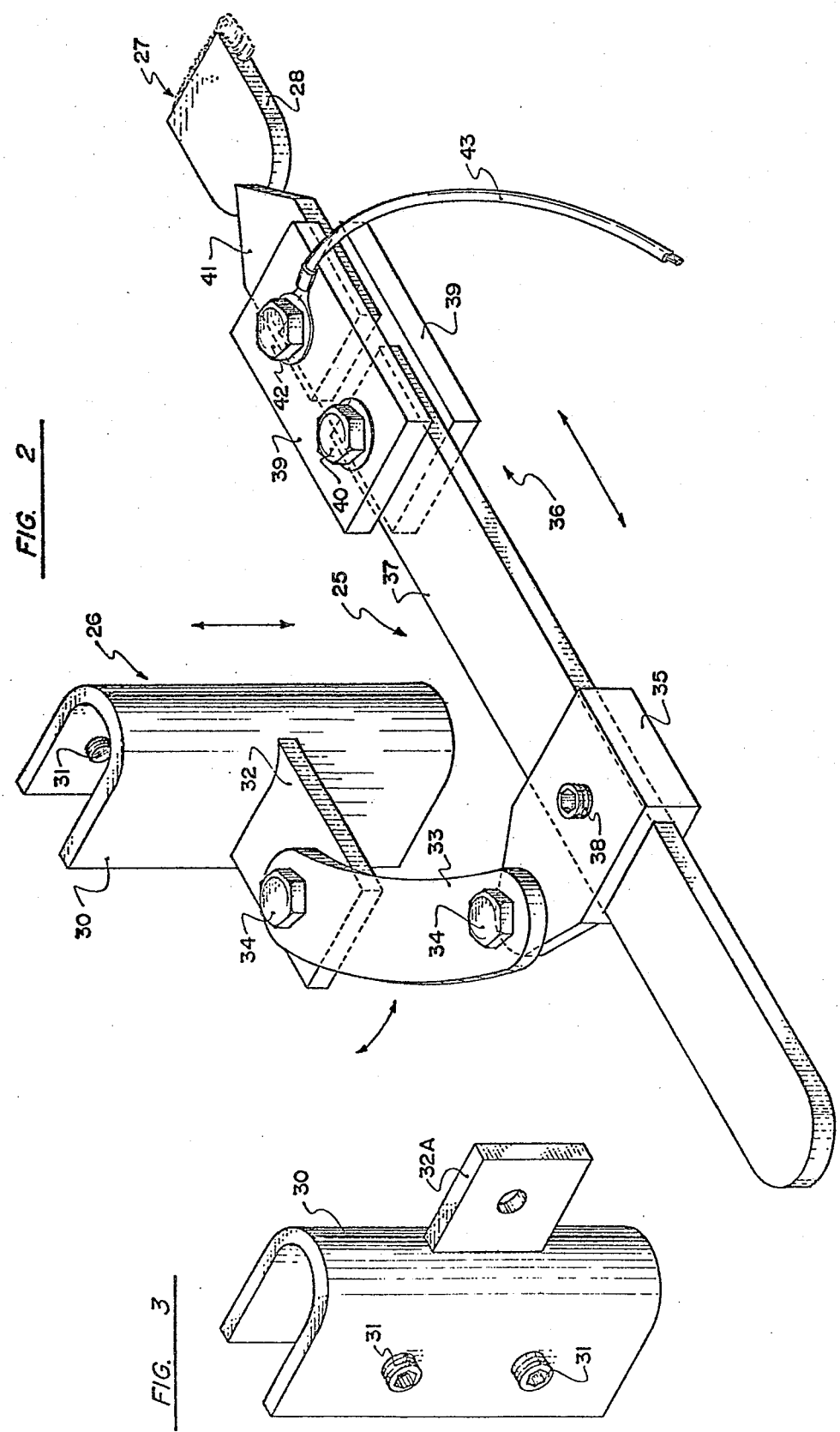

IMPLEMENT POSITION INDICATOR

BACKGROUND OF THE INVENTION

This invention relates to new and useful improvements in implement indicating devices and although it is designed specifically for use with a snow plow blade assembly, nevertheless it will be appreciated that it can be used on other implements such as agricultural implements i.e., discers and the like.

When a grader-type snow plow is used for clearing snow, it is difficult for the operator to ascertain the exact height of the blade above the ground due to the fact that it is often covered with snow.

It is obviously desirable that this position be known in order to avoid encountering obstructions in roadways, driveways and the like, but it is usual for the operator to guess the exact position of the underside of the blade so that inefficient plowing often occurs. If the operator lowers the blade too far, it often engages curbs, drains, sewer covers and the like with damage occurring either to these parts or to the blade itself.

SUMMARY OF THE INVENTION

The present invention overcomes these disadvantages and one aspect of the invention consists of an adjustably positioned indicating means on said implement, said means including an electrically operated indicator on said implement, first and second contact means operatively connected between said fluid operator and said implement, said contact means closing when said tool is at a predetermined position and means operatively connecting said indicator and said first and second contact means with said source of electrical energy.

The degree of adjustability of the device permits ready attachment to many implements and in particular, attachment to all types of snow clearing or bull-dozer blade type implements which include a mast used to support and raise and lower wing blades attached to such implements.

It is also a feature of the invention that the device is simple in construction, economical in manufacture and otherwise well suited to the purpose for which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a front view partially schematic, of a snow plow having at least one wing blade secured thereto.

FIG. 2 is an isometric view of the preferred embodiment of the invention enlarged with respect to FIG. 1.

FIG. 3 is an isometric view of an alternative attachment clip per se.

FIG. 4 is a schematic diagram showing one means of incorporating an indicator with the device.

FIG. 5 is a fragmentary enlarged view of the mast of FIG. 1 showing the positioning of the invention therein.

In the drawings like characters of reference indicate corresponding parts in the different figures.

DETAILED DESCRIPTION

Figure 6:
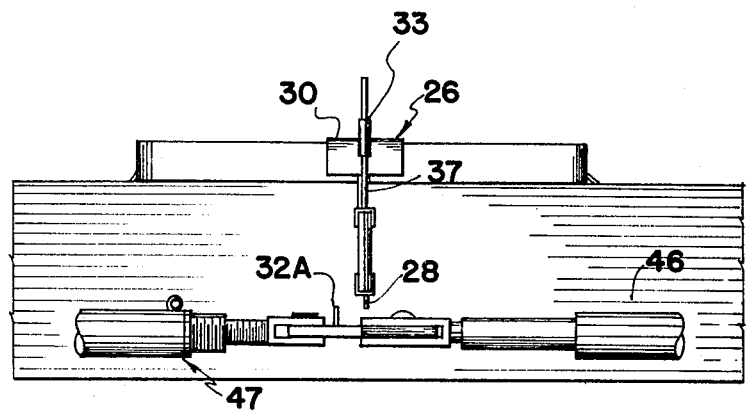
FIG. 6 is a partially schematic fragmentary front elevation of the invention secured to the frame of an agricultural implement such as a discer.

Proceeding to describe the invention in detail, reference should first be made to FIGS. 1 and 5 in which 10 illustrates generally, a snow plow having wheels 11, cab 12 and a source of power 13.

Incorporated in such plows is what is known as a wing blade assembly collectively designated 13 which is pivotally secured by the lower end thereof to one side of the chassis (not illustrated).

A vertical mast 14 extends upwardly from the chassis and is braced by diagonal 15. A fluid operator 16 is secured within the mast and includes the cylinder 17 and a piston rod 18 extending upwardly therefrom.

A sheave 19 is journalled for rotation at the distal end of the piston rod and a control cable 20 is anchored by one end thereof to the mast as indicated by reference character 21. It passes over the sheave 19 and then downwardly and around a further sheave 22 journalled for rotation adjacent the bottom end of the mast. It then extends upwardly and over a further sheave 23 journalled for rotation adjacent the upper end of the mast and then extends to adjacent the upper or distal end 24 of the wing blade assembly 13 so that extension and retraction of the fluid operator raises and lowers the wing blade assembly respectively.

It will, of course, be appreciated that the fluid operator 16 is operatively connected to the hydraulics of the snow plow 10 (not illustrated).

The invention collectively designated 25 is secured to the mast 14 and comprises a first contact portion or assembly collectively designated 26 and a second contact portion or assembly collectively designated 27. In this particular embodiment, the second contact portion comprises a metal plate 28 which is welded to one side of the bracket 29 carrying the sheave 19 on the distal end of the piston rod 18 so that this plate moves upwardly and downwardly with the piston rod 18.

The first contact portion or assembly 26, includes a clamp 30 which is substantially U-shaped in configuration in this embodiment. This clamp is adapted to engage one of the vertical flanges 14A of the mast 14 and can be clamped in any position vertically along this flange by means of clamp screws 31 screw threadably engaging one side of the U-shaped clamp 30 and engaging one surface of the flange 14A of the mast. The clamp screws 31 are preferably formed of hardened steel and have a pointed or conical inner end as shown in FIG. 2.

In the preferred embodiment, a lug or plate 32 is secured to the clamp 30 and extends to one side thereof and an arm 33 is pivotally secured by one end thereof to this lug 32 by means of nut and bolt assembly 34 so that the arm can be swung in an arc, in a substantially horizontal plane for adjustment purposes.

A slide bracket 35 is pivotally secured to the other end of arm 33 by means of nut and bolt assembly 34 and once again this slide clamp can be moved in an arc in a substantially horizontal plane once again for adjustment purposes.

A contact component collectively designated 36 includes a first member 37 slidably engageable through the sliding clamp 35 and being detachably secured in position within the clamp by means of clamp bolt assembly 38. This allows for in and out adjustment relative to the arm 33.

Insulating and resilient plates or pads 39 are secured adjacent the outer end of the member 37 by means of clamp bolt assembly 40 and a second member 41 is also secured between the pads or plates 39 by means of a further clamp bolt assembly 42 so that the members 41 and 37 are spaced apart but are in alignment when assembled as clearly shown in FIG. 2.

Electrical conductor 43 is secured to the clamp bolt assembly 42 and electrically connected to the member 41. This extends to an indicator 44 which may take the form of a lamp, buzzer or any similar indicator and is preferably mounted within the cab 12 so that it is conveniently viewed by the operator of the snow plow.

The plate 28 is grounded as illustrated in FIG. 4 and members 41 and 28 are operatively connected to a source of electrical power such as a battery 45 with the circuit being completed as shown schematically in FIG. 4.

In operation, the operator lowers the blade assembly 13, on clear ground, until the lower edge 13A is the desired distance above the surface of the ground, this action being accomplished by the fluid actuator 16. He then moves the U-shaped clamp 30 along the flange 14A of the mast until portion 41 contacts portion 28 and the circuit is completed in order to activate the indicator 44. He then clamps the U-shaped clamp 30 in position upon the mast 14.

When lowering the blade assembly 13, for snow clearing purposes, he merely actuates the fluid operator 16 until the indicator 44 is actuated thus indicating to him that blade has been lowered to the preset of predetermined lowermost position thus avoiding the situation where the blade is too high or too low relative to the surface which, of course, depends upon conditions.

The resilient mounting 39 not only insulates the portion 41 from the frame, but also permits over-ride to occur if the fluid operator is actuated still further thus lowering the blade to a greater degree. It allows the portion 41 to pass the portion 28 without damage occurring, but it will be appreciated that once passed, the circuit will be broken and the indicator will not be actuated.

FIG. 3 shows an alternative U-shaped clamp 30 in which the lug or plate 32A is situated vertically with respect to the clamp 30. This permits the assembly to be mounted with the actuator being situated for vertical movement, a condition which may be required depending upon design parameters of implements upon which the device may be used.

Although the invention is illustrated and described as being attached to the wing blade assembly of a snow plow, nevertheless it will be appreciated that it can be used for the main diagonal blade (not illustrated) if used, or to wing blades which do not utilize a mast assembly but are actuated hydraulically and pivoted to the implement frame.

Furthermore, the invention is also particularly suitable for use with agricultural implements such as discer type cultivators, seeder, or other ground engaging type of implement in which it is desirable to be informed about the depth penetration of the implement. The principle of operation is the same and the structure is the same inasmuch as the resilient mounting 39 is mounted on one part of the implement with the member 41 being mounted on the other. The said one part may be the fixed frame of the implement and the other part the movable portion which controls the depth of the ground engaging blades. The device may be set to indicate a preset depth and any deviation therefrom will, of course, be indicated. Alternatively, it may be set to indicate if a preset depth is exceeded with the warning system indicating such excess.

Figure 7:
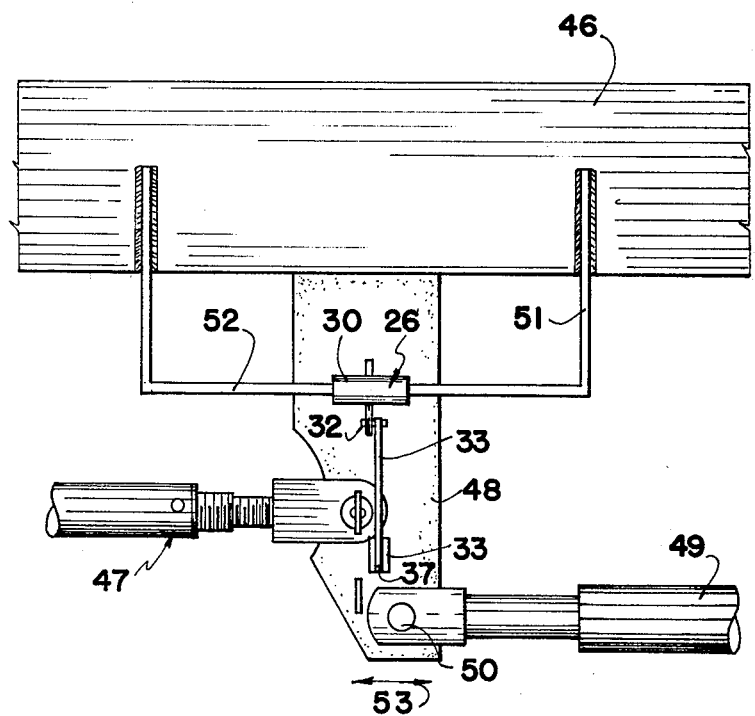
FIG. 7 is a plan view of FIG. 6.

FIGS. 6 and 7 show fragmentary view illustrating one method of attaching the device to an agricultural implement. In FIGS. 6 and 7, reference character 46 illustrates a portion of the main frame of an agricultural implement such as a discer with an hydraulical ram assembly 47 being shown, operatively connected to a pivoted lug 48 which is pivoted to the frame member 46. An actuating link 49 also is pivotally secured to the lug 49 by means of pivot pin 50 and this lever or link 49 is operatively connected to the raising and lowering mechanism (not illustrated) for the disc gang or other ground engaging portions of the implement.

A U-shaped frame member 51 is secured to the top of the frame member 46 and extends therefrom overlying the pivoted lug 48 and the U-shaped clamp 30 is secured to the front bar 52 of this member 51. The member 37 is mounted to the U-shaped clamp 30 in a manner similar to that hereinbefore described with the member 28 depending downwardly and being resiliently mounted as hereinbefore described.

The second member or lug 32 is secured to the pivoting lug 48 and extends upwardly therefrom in alignment with member 28 so that as the lug or mounting 48 moves in the direction of double-headed arrow 53, electrical contact is made or broken as hereinbefore described, it being operatively connected to the indicator 44.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In an implement which includes a tool and fluid operator means to raise and lower said tool, said implement including a source of electrical energy such as a storage battery; adjustably positioned indicating means on said implement, said means including an electrically operated indicator on said implement, first and second contact means operatively connected between said fluid operator means and said implement, said contact means closing when said tool is at a predetermined position and means operatively connecting said indicator and said first and second contact means with said source of electrical energy, said one contact means being adjustably connected for selected vertical positioning upon said implement, said one contact means including a mounting portion, means for detachably clamping said mounting portion to said implement for vertical adjustment thereto, a contact component secured to said mounting portion and means mounting said contact component for in and out and angular adjustment relative to said mounting portion.

2. The invention according to claim 1 in which said implement includes a scraper blade assembly pivotally secured thereto for raising and lowering action, a mast for supporting said blade assembly, said fluid operator being situated within said mast and including a piston rod and a cylinder, one of said contacts being on said mast, the other of said contacts being on said piston rod.

3. The invention according to claim 1 in which one of said contacts includes a mounting portion and flexible insulated contact component extending from said mounting portion.

4. The invention according to claims 1, 2 or 3 in which said last mentioned means includes a pivot mounting said contact component for movement in a substantially horizontal plane, a first member adjustably secured to said pivot mounting for in and out movement in a substantially horizontal plane, a second member acting as the distal end of said contact component and resilient and insulating means connecting said first and second members together.

5. The invention according to claim 2 in which one of said contact means includes a mounting portion and a flexible insulated contact component extending from said mounting portion.

6. The invention according to claim 5 which includes means mounting said contact component for in and out angular adjustment relative to said mounting portion, said last mentioned means including a pivot mounting supporting said contact component for movement in a substantially horizontal plane, a first member adjustably secured to said pivot mounting for in and out movement in a substantially horizontal plane, a second member acting as the distal end of said contact component and resilient and insulating means connecting said first and second members together.

* * * * *